US008434055B2

(12) United States Patent
Budinsky et al.

(10) Patent No.: US 8,434,055 B2
(45) Date of Patent: Apr. 30, 2013

(54) APPARATUS, SYSTEM, AND METHOD FOR HIDING ADVANCED XML SCHEMA PROPERTIES IN EMF OBJECTS

(75) Inventors: Frank Budinsky, Newmarket (CA); Kapil D. Katyal, Arlington, VA (US); Yang Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1429 days.

(21) Appl. No.: 11/828,957

(22) Filed: Jul. 26, 2007

(65) Prior Publication Data
US 2009/0031279 A1    Jan. 29, 2009

(51) Int. Cl.
*G06F 9/44*    (2006.01)

(52) U.S. Cl.
USPC .......................... 717/104; 717/102; 717/107

(58) Field of Classification Search .................. None
See application file for complete search history.

(56) References Cited

U.S. PATENT DOCUMENTS

| | | | |
|---|---|---|---|
| 6,564,368 B1 | 5/2003 | Beckett et al. ................ | 717/113 |
| 6,678,882 B1 | 1/2004 | Hurley et al. ................ | 717/121 |
| 6,918,107 B2 | 7/2005 | Lucas et al. ................ | 717/124 |
| 6,996,809 B2 | 2/2006 | Muhlestein et al. ........ | 717/130 |
| 7,506,303 B2 * | 3/2009 | Gupta et al. ................ | 717/104 |
| 7,627,863 B2 * | 12/2009 | Chen ............................ | 717/146 |
| 7,653,898 B1 * | 1/2010 | Ali et al. ...................... | 717/122 |
| 2005/0278710 A1 | 12/2005 | Lucas et al. ................ | 717/136 |
| 2006/0015854 A1 | 1/2006 | Muhlestein et al. ........ | 717/130 |
| 2006/0156277 A1 | 7/2006 | Gupta et al. ................ | 717/104 |
| 2007/0150864 A1 * | 6/2007 | Goh ............................ | 717/113 |

OTHER PUBLICATIONS

Tuscany, "Hide special Sequence-type properties from SDO Types",Jul. 6, 2006, Tuscany, p. 1-46.*
Brealey, "Developing Web Services with EMF SDOs for complex XML schema",Mar. 3, 2006, IBM developerWorks, p. 1-34.*
ECMA, "ECMAScript for XML (E4X) Specification", Dec. 2005, p. 1-109.*
Beatty et al., "Next-Generation Data Programming: Service Data Objects", A Joint Whitepaper with IBM and BEA, Nov. 2003.
Apache Tuscany; Service Data Object Overview http://cwiki.apache.org/TUSCANY/sdo-overview.html.
IBM, Introduction to Service Data Objects http://www-128.ibm.com/developerworks/java/library/j-sdo/.
The Eclipse Modeling Framework (EMF) Overview http://dev.eclipse.org/viewcvs/indextools.cgi/org.eclipse.emf/doc/org.eclipse.emf.doc/references/overview/EMF.html.
The Eclipse Modeling Framework Project (EMF) http://www.eclipse.org/modeling/emf/.

* cited by examiner

*Primary Examiner* — Li B Zhen
*Assistant Examiner* — Duy Khuong Nguyen
(74) *Attorney, Agent, or Firm* — Kunzler Law Group, PC

(57) ABSTRACT

An apparatus, system, and method for hiding advanced XML schema properties in EMF objects. XML Schema may comprise both user-defined properties and internal properties related to the structural features of the schema. The present invention hides the internal properties from clients while still keeping them available such that a complete XML Schema model can be generated, but without exposing a client to the non-intuitive internal properties. An SDO implementation leverages EMF implementation artifacts to present a client with an SDO API exposing user-defined properties and metadata describing user-defined properties. The SDO implementation further provides an extended API through which a client may access internal properties and metadata describing the internal properties. The invention further accounts for both dynamic SDO objects and static SDO objects.

38 Claims, 7 Drawing Sheets

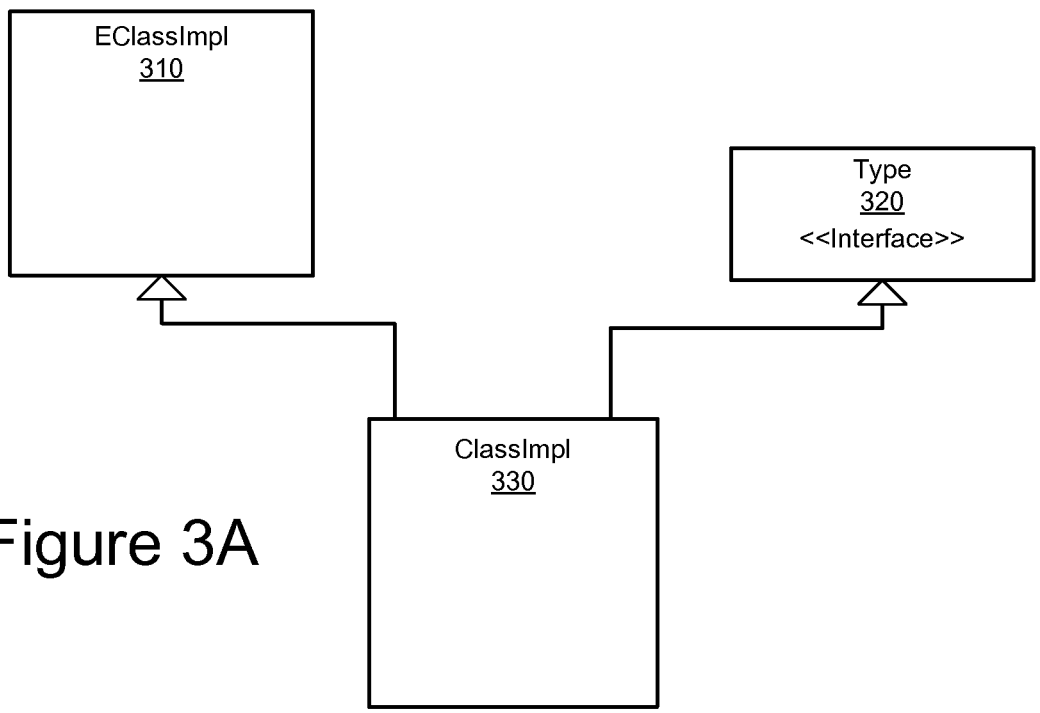
Figure 3A
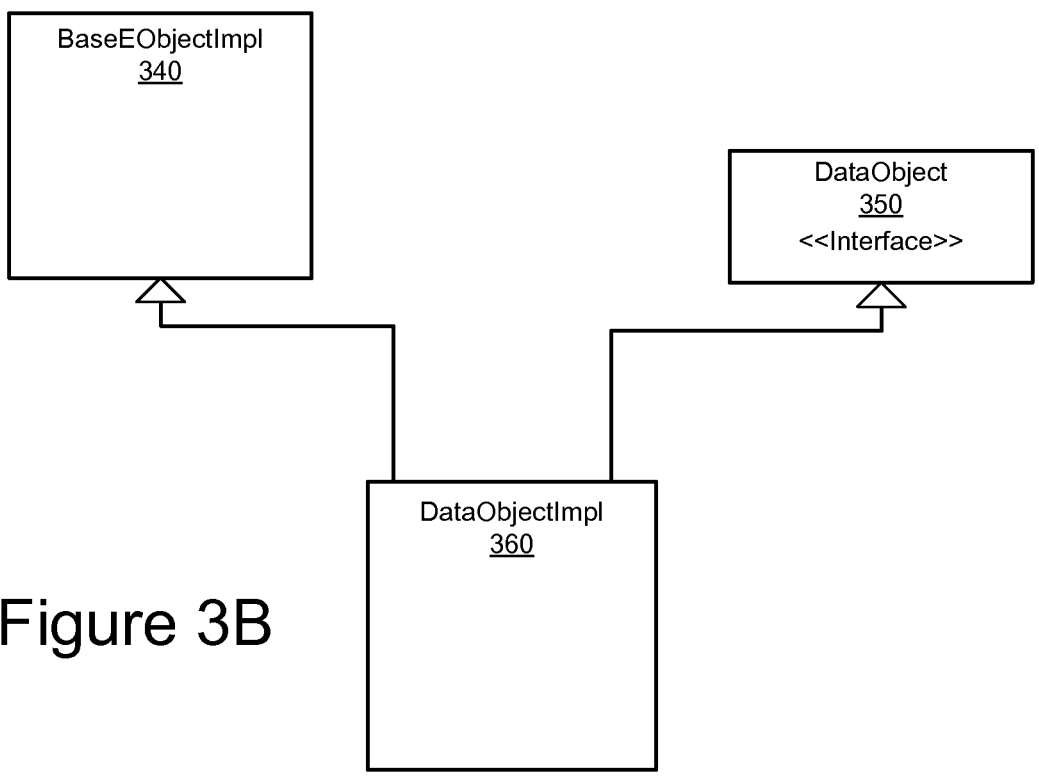
Figure 3B
Figure 3

APPARATUS, SYSTEM, AND METHOD FOR HIDING ADVANCED XML SCHEMA PROPERTIES IN EMF OBJECTS

BACKGROUND OF THE INVENTION

1. Field of the Invention

This invention relates to mapping XML Schema definitions to objects. More specifically, the invention relates to mapping XML Schema definitions to objects such that a simple interface for the object is presented to the client which is easy to understand, while the complicated internal aspects of the object related to advanced features of XML Schema are still maintained in the object, but hidden from the client.

2. Description of the Related Art

XML has become a ubiquitous member of the computing landscape, providing a human-readable and portable format for data exchange. However, many applications are designed to work with, or simply work better with, object representations of data as opposed to an XML representation. As a result, a number of solutions exist which map XML Schema definitions (which describe and define the structure of an XML document) to objects; for example, the Eclipse Modeling Framework (EMF), Service Data Objects (SDO), or JAXB all provide solutions. The solutions mentioned generate various types of XML representation object models which allow an XML document to be treated as an object. The above solutions are not restricted to representing only XML documents as objects and may be used to translate various formats to objects; for example, SDO may also be used to translate models such as those developed using IBM's Rational Rose software to objects.

XML, however, poses a unique modeling challenge. In many instances, the richness and flexibility of XML Schema complicates the translation process. XML Schema features such as wildcards, substitution groups, and repeated model groups do not intuitively map to obvious object properties. As a result, the object model may contain properties which a typical user may not understand, making the use of these objects a more complicated process. In this field of endeavor, the term 'user' or 'client' referenced above refers to software developers. Thus, technologies for implementing mapping of XML Schema definitions have had to choose between simplicity (where the advanced features are simply ignored) or completeness (where the advanced features are mapped and presented to the user).

For example, a part of an XML Schema may specify the following:

```
<xs:element name="RealEstate">
    <xs:complexType>
        <xs:sequence>
            <xs:element name="building" type="xs:string"/>
            <xs:element name="owner" type="xs:string"/>
            <xs:element ref="tenant"/>
        </xs:sequence>
    </xs:complexType>
</xs:element>
<xs:element name="tenant" type="tenant"/>
    <xs:complexType name="tenant">
        <xs:sequence>
            <xs:element name="name" type="xs:string"/>
        </xs:sequence>
    </xs:complexType>
...
</schema>
```

The above maps to the simple Java interface below:

```
public interface RealEstate {
    String getBuilding( );
    void setBuilding(String value);
    String getOwner( );
    void setOwner(String value);
    String getTenant( );
    void setTenant(Tenant value);
}
```

The model above is simple and easy to understand by one of skill in the art. However, as shown below, additional complexities may appear when the schema contains additional XML features:

```
<xs:element name="Realestate">
    <xs:complexType>
        <xs:sequence>
            <xs:element name="building" type="xs:string"/>
            <xs:choice maxOccurs="unbounded">
                <xs:element name="individualOwner" type="xs:string"/>
                <xs:element name="corporateOwner" type="xs:string"/>
            </xs:choice>
            <xs:element ref="tenant"/>
        </xs:sequence>
    </xs:complexType>
</xs:element>
<xs:element name="tenant" type="tenant"/>
    <xs:complexType name="tenant">
        <xs:sequence>
            <xs:element name="name" type="xs:string"/>
        </xs:sequence>
    </xs:complexType>
<xs:element name="ratedTenant" substitutionGroup="tenant" type="ratedTenant"/>
    <xs:complexType name="ratedTenant">
        <xs:complexContent>
            <xs:extension base="tenant">
                <xs:sequence>
                    <xs:element name="rating" type="xs:int"/>
                </xs:sequence>
            </xs:extension>
        </xs:complexContent>
    </xs:complexType>
...
</schema>
```

The above maps to a more complicated Java interface below:

```
public interface Realestate {
    String getBuilding( );
    void setBuilding (String value);
    String getIndividualOwner( );
    void setIndividualOwner (String value);
    String getCorporateOwner( );
    void setCorporateOwner (String value);
    String getTenant( );
    void setTenant(Tenant value);
    FeatureMap getGroup( );
    FeatureMap getTenantGroup( );
}
```

A typical user will not have need for, nor understand, the FeatureMap getGroup( ) and FeatureMap getTenantGroup( ) aspects of the interface. The information represented in these statements pertains to the internal features of the XML Schema document; in most instances, these internal features relate to structural features of the data, as opposed to the substance of the data itself.

The presentation of this additional information will often confuse the user since the information does not correspond to the expected, user-defined properties of the XML document such as the building, owner, etc. As mentioned above, one possible solution is to simply choose not support these additional features and remove them from the schema-to-object mapping implementation. However, this additional information is needed to accurately represent all aspects of the XML Schema. For example, if at some point the client attempts to map from the object to an XML document, the XML document may be incomplete in comparison to the original if the advanced features defining the structure of the data were removed.

Technologies which choose completeness impose additional burdens on their clients, who need to be able to distinguish simple from advanced properties and know which ones to use in order to obtain the desired results. Technologies which choose simplicity lose information that may be of use to advanced users, and also lose the ability to accurately reproduce the XML document from the object.

SUMMARY OF THE INVENTION

Applicants submit that there exists a need for a mapping technology which can fully support all XML Schema documents and present a simple view to the user without simply ignoring or not supporting the advanced features. Ideally, the solution should allow a user to access the advanced features, but only present the simple features absent a specific request to view the advanced features. The solution should also impose little additional computing overhead.

The present invention has been developed in response to the present state of the art, and in particular, in response to the problems and needs in the art that have not yet been fully solved. Accordingly, the present invention has been developed to provide an apparatus, system, and method for hiding advanced XML Schema properties in EMF objects.

The present invention comprises a computer program product comprising a computer usable medium having a computer readable program for hiding advanced Extensible Markup Language (XML) schema features in Service Data Objects (SDO), the operations of the computer program product comprising manipulating one or more Eclipse Modeling Framework (EMF) artifacts, determining the internal properties of an EMF model and the user-defined properties of the EMF model, and automatically creating a SDO model from the EMF model, the SDO model configured to expose to a client the user-defined properties of the SDO model and hide from the client the internal properties of the SDO model.

Determining internal properties of the EMF model and the user-defined properties of the EMF model further comprises comparing properties of the EMF model to predefined set of internal properties and identifying the internal properties of the EMF model as those that match the predefined set of internal properties and the user-defined properties of the EMF model as those that do not match the predefined set of internal properties.

Automatically creating a SDO further comprises a SDO artifact returning user-defined properties of the SDO model in response to a client invoking a service configured to return property information of the SDO.

The computer program product further comprises issuing a call to a SDO API such that a SDO artifact receives a request comprising a parameter identifying a property, invokes a service configured to validate the parameter, and accesses a property of the EMF model in response to an acknowledgement from the service that the parameter references a valid user-defined property.

Further, in the computer program product, the SDO model exposes the internal properties of the SDO model to a client by way of an extended API, the extended API invoking EMF model methods.

Where the SDO model directly hosts one or more static property values, automatically creating a SDO model from the EMF model further comprises assigning properties of the SDO model a modified index value such that internal properties are distinguished from user-defined properties. In addition, where the SDO model directly hosts one or more static property values, the computer program product further comprises receiving from a client a request comprising the modified index value of a property as a parameter and mapping the modified index value to an actual index value of the property. Mapping the modified index value further comprises associating the modified index value received from a client with an internal SDO model index and operating on a property value associated with the internal SDO model index. In a preferred embodiment, a positive modified index value is assigned to a user-defined property and a negative modified index value is assigned to an internal property.

Creating an SDO model from the EMF model further comprises returning SDO model metadata in response to a client request, wherein the metadata concerns user-defined properties in response to a client request by way of a SDO Application Programming Interface (API), and concerns internal properties in response to a client request by way of a SDO extended API. The SDO model is configured to expose the expected properties by way of a SDO model interface and to expose internal properties exclusively by way of an extended interface.

In a preferred embodiment, the EMF artifacts are classes and interfaces, and manipulating EMF artifacts comprises extending EMF classes and implementing interfaces.

Also disclosed is a system for hiding advanced XML schema features in XML representation object models, which system comprises one or more processors in communication with memory comprising an XML schema document, an Eclipse Modeling Framework (EMF) implementation, and a Service Data Object (SDO) implementation. The SDO implementation further comprises an SDO property module configured to compare properties of the EMF model to a predefined set of internal properties, and to identify the internal properties of the EMF model as those that match the set of internal properties and the user-defined properties of the EMF model as those that do not match the set of internal properties, an SDO data object implementation module comprising an Application Programming Interface (API) configured to expose user-defined properties of an SDO, and an SDO internal properties access module comprising an extended API configured to expose internal properties of the SDO.

In certain embodiments, the SDO data object implementation module further comprises an SDO metadata module configured to reveal SDO metadata for user-defined properties, and wherein the SDO internal properties access module further comprises an SDO extended metadata module configured to reveal SDO metadata for internal properties.

In addition, the EMF implementation may further comprise a EClassImpl class and a BasicEObjectImpl class, and the SDO implementation may further comprise a ClassImpl class extending the EClassImpl class and a DataObjectImpl class extending the BaseEObjectImpl class.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3A-B is a schematic class diagram illustrating one embodiment of an implementation of using EMF artifacts to hide advanced XML schema properties in a dynamic data object in accordance with the present invention;

DETAILED DESCRIPTION OF THE INVENTION

Figure 1:
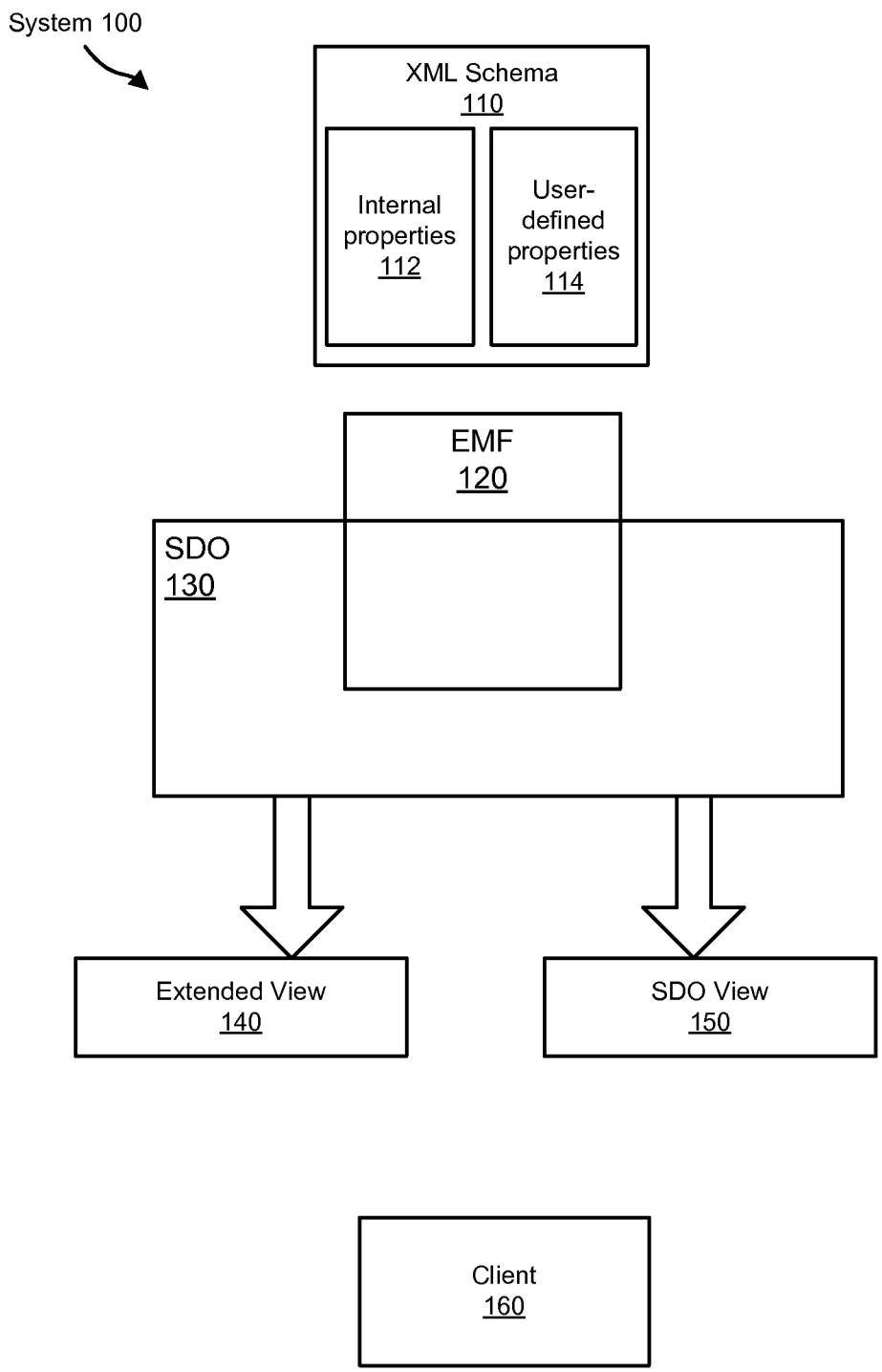
FIG. 1 is a schematic block diagram illustrating one embodiment of a system for hiding advanced XML schema properties in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. The instructions represented by the modules may be stored on various forms of computer readable storage media.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram illustrating one embodiment of a system 100 for hiding advanced XML schema properties in XML representation object models. In one embodiment, the system 100 includes an XML Schema 110, an EMF model 120, an SDO model 130, an extended view 140, a SDO view 150, and a client 160. In a typical embodiment, the system 100 is executed on a computer comprising a processor and memory, not shown in FIG. 1. However, those of skill in the art will recognize that the system elements depicted in FIG. 1 need not all reside on the same physical computer and that the invention as described is not limited to such an embodiment.

The system 100 for hiding advanced XML schema properties in XML representation object models includes an XML Schema 110. As discussed above, and as known to those of skill in the art, an XML schema 110 is a description of an XML document which specifies the structure and the expected and allowed content of an XML document. An XML Schema 110 may define element types and also impose detailed constraints (such as limiting a particular value to a positive integer) on types. In order to be deemed valid, an XML document must be well-formed and also comply with an associated XML Schema 110.

The XML Schema 110 further comprises internal properties 112 and user-defined properties 114. User-defined properties 114 are those elements specified by the creator of the XML Schema 110 which constitute the core data associated with the XML Schema 110. For example, in the example schema above, "building" and "owner" would both constitute user-defined properties. In contrast, internal properties 112 constitute the structural, relational information of the XML Schema 110 which describes the relationships among XML Schema 110 elements. In the example schema above, the substitution group constitutes an internal property 112. Those of skill in the art will recognize that the 'user' referenced in the term "user-defined properties" is not necessarily, and in many instances will not be, the same 'user' interacting with the model provided by the present invention.

The system 100 further comprises an XML representation object model, which in the depicted embodiment is EMF module 120. Those of skill in the art will recognize that an XML representation object model, as used in connection with the present invention, constitutes an object model mapped from an XML schema. Those of skill in the art will recognize that other XML representation object models could be used without departing from the essence of the present invention.

EMF module 120 is a modeling framework and code generation facility for building tools and applications based on a structured data model such as an XML Schema document. EMF provides tools necessary to produce Java classes for the model, allowing EMF models of XML schema to be used as objects. As mentioned above, the EMF module 120 provides a complete solution which fully supports XML schemas such as the XML schema 110; however, the EMF model exposes both the complicated internal properties of the XML schema and the user-defined features of the XML schema.

EMF module 120 further comprises EMF artifacts (not shown), which constitute the modules and components of EMF module 120 which provide the functionality described above. For example, EMF artifacts comprise the various classes and interfaces that make up EMF.

The system 100 further comprises a practical XML representation object model, which in the depicted embodiment is produced by an SDO module 130. For purposes of the specification, a practical XML representation object model is an XML representation object model which exposes to a client its user-defined properties while hiding its internal properties. Those of skill in the art will recognize that other modules may be adapted to generate practical XML representation object models without departing from the essence of the present invention. For example, those in the art may modify the EMF module 120 such the modified module 120 hides internal properties in order to make it a practical XML representation object model.

SDO module 130 allows clients to access and manipulate data from heterogeneous data sources such as relational databases and XML data sources. Like EMF module 120, SDO module 130 allows SDO models of XML schema to be used as objects.

SDO module 130 further enables both static (strongly typed) programming models and dynamic (loosely typed) programming models. Static interfaces provide models which are more familiar to, and more easily managed by, users. Dynamic models, however, are necessary in instances where the shape of the resulting data is not known beforehand. Dynamic models, for example, are commonly needed by tools and frameworks. Dynamic and static models in connection with SDO module 130 and the present invention are discussed in greater detail below. SDO module 130 further provides a client 160 with a metadata API that allows introspection of the data model. In accordance with the present invention, the metadata API is incorporated into SDO View 150 and Extended View 140 as discussed in greater detail below.

In a preferred embodiment of the invention, SDO module 130 does not simply receive a completed EMF module 120 object and use that object as the base material from which it can construct an SDO. Rather, SDO module 130 leverages the EMF module 120 as described below in connection with FIGS. 3 and 5 in order to provide the extended view 140 and the SDO view 150. More particularly, SDO 130 manipulates EMF 120 artifacts (not shown) in order to provide the desired functionality. The intersection of EMF 120 by SDO 130 in FIG. 1 is symbolic of this relationship.

SDO view 150 is a view of an SDO that reveals only user-defined properties of the relevant SDO model. In addition, SDO view 150 returns only metadata gathered from user-defined properties of the relevant SDO model. In one embodiment, SDO View 150 is the standard SDO API and includes a set of interfaces and functions to enable a user to interact with the user-defined properties of the SDO. For example, a particular SDO model named 'alpha' may have five properties, three of which are user-defined and two of which are internal. If a client 160 requests a list of the properties of alpha from SDO View 150, only the user-defined properties are returned. Similarly, if the client 160 requests the number of properties of alpha, the number returned would be three. If a client 160 utilized a 'get' method associated with alpha, and indicates one of the internal properties as the subject of the 'get' invocation, the return value is an indication that the specified property does not exist.

The system 100 also comprises an extended view 140. The extended view 140 provides a client 160 with access to the internal properties of the SDO model which are hidden when using the SDO View 150. In a preferred embodiment, the extended view 140 is an extended API which a client 160 invokes to use or discover internal properties. To continue the example above, a client 160 may utilize a 'get' method associated with alpha and indicate one of the hidden properties as the subject of the invocation, but utilize the extended view 140 instead of the SDO view 150. The extended view 140 returns the requested hidden property in response. If a client 160 requests the number of hidden properties in alpha, extended view 140 reveals that there are two.

The system 100 further comprises a client 160. The client 160 interacts with SDO 130 objects, usually in order to manipulate the data represented by the object, through the SDO view 150 and the extended view 140. The client 160 may be a user such as a software designer or programmer, and in other embodiments may be a software application. For example, in common embodiments, the client 160 may be tooling software.

Figure 2:
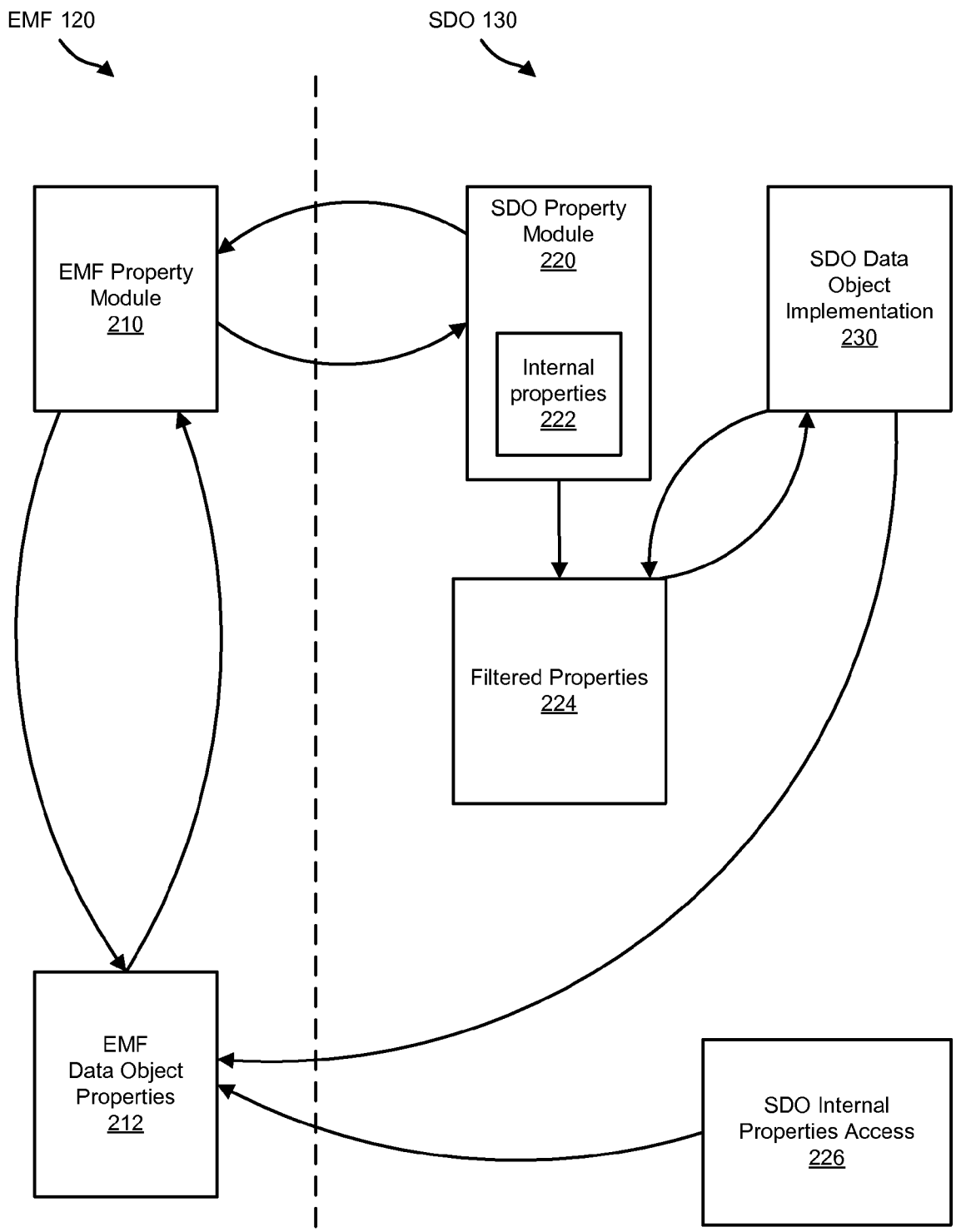
FIG. 2 is a schematic block diagram illustrating one embodiment of using EMF artifacts to hide advanced XML schema properties in a dynamic data object in accordance with the present invention.

FIG. 2 is a schematic block diagram illustrating one embodiment of using EMF artifacts to hide advanced XML schema properties in a dynamic SDO in accordance with the present invention. While static data objects are generated Java class objects, dynamic data objects are generic SDO implementation objects. For example, a client 160 could instantiate and work with a dynamic data object with code such as that below:

```
DataObject workSpace = dataFactory.create(tns, "Realestate");
workSpace.set("building", "Hernandez Building");
workSpace.set("individualOwner", "Mike Hernandez");
....
String owner = workSpace.get("individualOwner");
```

Those of skill in the art will recognize that in the above code segment workSpace is a generic implementation of the SDO DataObject interface. Thus, workSpace is a DataObject object, as opposed to a Realestate object.

FIG. 2 is a representation of modules for presenting a simplified view of a dynamic SDO model in accordance with the present invention. An EMF property module 210 is an EMF 120 artifact which provides information regarding the properties associated with an EMF model, which properties are stored in the EMF artifact EMF Data Object Properties module 212. The EMF property module 210 comprises methods which, when invoked, reveal metadata concerning the properties stored in EMF data object properties 212. For example, EMF property module 210 may comprise a getDeclaredProperties method which returns the properties stored in EMF data object properties module 212 and a getProperties method which returns both inherited properties and the declared properties of the EMF data object.

SDO property module 220 is an SDO artifact which determines the properties exposed as part of the SDO data object. Similar to the EMF artifacts described above, in a preferred embodiment SDO artifacts are the classes and interfaces that make up the Service Data Object. Like the EMF property module 210, SDO property module 220 comprises methods which, when invoked, reveal metadata concerning the properties which constitute the SDO.

SDO property module 220 further comprises internal properties module 222. In one embodiment, internal properties module 222 is a data structure such as a list comprising a predefined set of internal properties that should be hidden from a client 160. The SDO property module 220 invokes the methods of the EMF property module 210 to get a complete list of all properties, both internal and user-defined, from EMF, and then compares the result of the methods against the predefined set of internal properties in the internal properties module 222. Properties which are found in both the internal properties module 122 and in the result of the method call are removed from the list of properties exposed by SDO property module 220, such that the SDO property module 220 creates the filtered properties 224.

In another embodiment, internal properties module 222 may be a method which determines the internal properties of the EMF object. The SDO property module 220 invokes the methods of EMF property module 210 to get a complete list of all properties from EMF and also invokes the method of internal properties module 222 to determine which of the properties returned constitute internal properties and which constitute user-defined properties. Based on the result of the two methods, SDO property module 220 creates the filtered properties 224. For example, internal properties module 222 may comprise code which removes any FeatureMap property returned by a call to EMF property module 210, assuming that all FeatureMap properties are deemed to be internal properties hidden as part of the SDO implementation. Alternatively, internal properties module 222 may invoke the method getEStructuralFeatures of the EMF property module and suppress all properties returned in response, such that they are hidden from a client 160, assuming that the properties returned in response to a getEStructuralFeatures invocation are internal properties to be hidden.

Filtered properties 224 is the set of user-defined properties derived from an EMF 120 object through the EMF artifacts such as EMF property module 210 and EMF data object properties 212. The internal properties of the EMF 120 object still exist as part of an EMF 120 object, but are not exposed in the filtered properties 224. In one embodiment, the filtered properties 224 may be a separate list of properties. Alternatively, filtered properties 224 may never be an actual object or list; rather, filtered properties 224 may comprise the result of the interaction between the SDO property module 220, internal properties module 222, and the EMF property module 210.

SDO data object implementation 230 represents the actual data object that may be used by a client 160. The client 160, for example, may instantiate and use a new SDO data object implementation 230 such as "workSpace" as shown above. The SDO data object implementation 230 references the filtered properties module 224 in performing a client-requested operation or when returning metadata concerning its properties. As such, even if internal properties are a part of the underlying EMF data object properties 212, these properties are not exposed as part of a SDO data object implementation 230. The property accessors of the SDO data object implementation 230 (which are part of the standard SDO APIs) are implemented such that they use the filtered property list before calling EMF to access the property as stored in the EMF data object properties 212.

SDO Data Object Implementation module 230 may further comprise a SDO metadata module (not shown) configured to reveal SDO metadata for user-defined properties. The SDO metadata module allows a client 160 to discover information concerning the SDO data object by means of introspection APIs. For example, a client 160 may request the number of properties, or a list of properties, associated with the SDO data object. The SDO metadata module returns to the client 160 metadata related only to the user-defined properties as defined in filtered properties 224, thus hiding the existence of internal properties.

The SDO data object implementation module 230 provides a client 160 with an API configured to expose to the client 160 the user-defined properties of the SDO. The SDO Internal properties access module 226 provides a client 160 with an extended API configured to expose the internal properties of the SDO, and in addition, allow the client 160 to access those values.

With the above design, SDO clients using standard SDO APIs (SDO View 150), which are associated with SDO data object implementation 230, will see only the simple view of the SDO 130. The SDO internal properties access module 226 allows a client 160 access to internal properties and metadata concerning those internal properties in EMF data object properties 212. SDO internal properties access module 226 provides the client 160 with the extended view 140, described above. The implementation of extended methods may be implemented as shown by making calls to the underlying EMF methods, such as eGet, through EMF APIs, which still have access to the hidden properties.

In one embodiment, SDO internal properties access module 226 may be a separate class providing an extended API as follows:

```
class SDOUtil {
    public static Sequence getSubstitutionValues (DataObject dataObject,
Property head)
    ...}
```

By passing the SDO internal properties access module 226, as embodied above, a data object (such as workSpace) and an identifying trait of the internal feature the user wants to access, a client 160 can access internal properties and metadata revealing internal properties. Those of skill in the art will recognize that numerous ways of identifying a property are possible, and may in fact vary based on characteristics of the property which is hidden.

The SDO internal properties access module 226 may further comprise an SDO extended metadata module (not shown) configured to reveal SDO metadata for internal properties. A client 160 may request metadata concerning the internal properties of the SDO in order to discover what properties are available for use. The SDO extended metadata module returns to the client metadata concerning the nature of the properties; for example, the SDO extended metadata module may return information concerning the number of, or names of, the internal properties. As noted above, this information is not available through the SDO data object implementation module 230.

FIG. 3 is a schematic class diagram illustrating an embodiment of an implementation of the functionality and modules described in FIG. 2. FIG. 3A illustrates a preferred embodiment for implementation of property-hiding. Those of skill in the art will recognize that in SDO, in accordance with the present invention, the Type 320 interface is used to access the simple properties. In one embodiment, the Type interface specifies:

```
interface Type {
    List getDeclaredProperties( );
    List getProperties( );
    Property getProperty(String name);
    ...
}
```

Those of skill in the art will recognize that EClassImpl 310 comprises a class which is part of EMF 120. EClassImpl 310 comprises methods such as getEAllStructuralFeatures( ), getEAttributes, getEStructuralFeatures( ), and others found in the EMF Javadoc. These methods, and others not listed, can be used to discover both user-defined and internal properties of an EMF object.

The SDO Type implementation class, ClassImpl 330, contains property-accessing methods which filter the list of EMF structural features, as explained in connection with FIG. 2. As shown in FIG. 3A, in a preferred embodiment, ClassImpl 330 extends EClassImpl 310 and implements Type 320 interface. ClassImpl 330 both uses and overrides the methods of EClassImpl 310 in order to provide the functionality of the present invention. For example:

```
class ClassImpl extends EClassImpl implements Type
...
{
    public List getDeclaredProperties( ) {
        // implement an algorithm to return a List of only user-defined
        properties.
        Possible algorithms and approaches are described below.
    }
    public List getProperties( ) {
        // implement an algorithm to return a List of only user-defined
        properties.
        Possible algorithms and approaches are described below.}
    public Property getProperty(String name) {
        // Query getProperties( ).
    }
    ...
}
```

The methods above may filter the internal properties by invoking EClassImpl 310 methods such as getEStructuralFeatures( ) and removing the returned properties from the list of all properties returned by the method. In the above embodiment, getProperties( ) provides the filter as described in connection with FIG. 2. For example, getProperties( ) may have code in it which, when invoked, uses getEStructuralFeatures to create a static list of internal properties. It may then call the getProperties( ) method of EClassImpl 310 to get a list of the properties, both user-defined and internal, of the EMF object. The getProperties( ) method may then comprise a simple algorithm to compare the results of both methods and return a List of properties which are unique to the getProperties( ) invocation. The resulting return value is a List of properties, with the internal properties filtered out. Those of skill in the art will recognize that any number of algorithms and approaches may be used to filter the internal properties, including filtering out internal properties by using a dynamic view of the getEStructuralFeatures( ) result.

Methods such as getProperty( ) may then leverage the getProperties( ) method of ClassImpl 330 to determine if the property is internal or user-defined. Those of skill in the art will recognize that multiple methods of determining internal properties that should be filtered, and methods for filtering them, are possible, and that the present invention is not limited to any particular method for doing so.

FIG. 3B illustrates one embodiment for exposing user-defined properties through standard SDO APIs while hiding internal properties in accordance with the present invention. Those of skill in the art will recognize that BaseEObjectImpl 340 comprises a class of EMF 120. BaseEObjectImpl class 340 includes methods such as eGet, which in one embodiment takes an EStructuralFeature as a parameter and returns the value of the given feature. BaseEObjectImpl class 340 further comprises methods such as eSet and eIsSet, and others founds in the EMF Javadoc. Those of skill in the art will further recognize that BaseEObjectImpl class 340 makes use of other EMF methods, such as those found in EClassImpl 310 to provide its functionality.

DataObject 350 interface specifies methods associated with an SDO object implementation; for example, the DataObject interface specifies:

```
interface DataObject . . . {
    get. . .(property);
    void set. . .(property, value);
    ...
}
```

DataObjectImpl 360 extends the BaseEObjectImpl 340 class and implements the DataObject 350 interface to provide the current functionality. The SDO DataObjectImpl property accessors are implemented to use the filtered properties, as described above, before calling EMF to access the property. For example,

```
class DataObjectImpl extends BasicEObjectImpl implements
DataObject {
    public get. . .(property) {
        ...
    }
    public void set. . .(property, value) {
        . . .}
    public boolean isSet (property) {
        . . .}
    ...
}
```

An invoked method listed above, or others provide by SDO but not illustrated, first ensures that the property passed as a parameter is a user-defined property by invoking getProperties( ) from ClassImpl 330, to validate the parameter. If the property is validated, the method invokes eGet to use EMF to get the property value. This same general pattern can be repeated for all of the methods provided as part of the DataObjectImpl 360 class.

While the embodiment just described properly handles the dynamic SDO case, additional work is required for static SDO objects. As described above, static SDO objects are generated classes which directly host the property values associated with a particular SDO object. In contrast to the dynamic SDO case, where the properties were part of a generic SDO object, in the static case the properties are part of the particular class. For example, to continue with the examples used above, a client may instantiate and work with a static SDO object as follows:

```
Realestate myPlace = (Realestate) dataFactory.create(Realestate);
myPlace.setBuilding("Smith Bank Building");
...
String name = myPlace.getIndividualName( );
```

In contrast to the dynamic case above, where a generic DataObject was instantiated, the static case creates and works with an actual Realestate object, which in the example above is the myPlace Realestate object.

Figure 4:
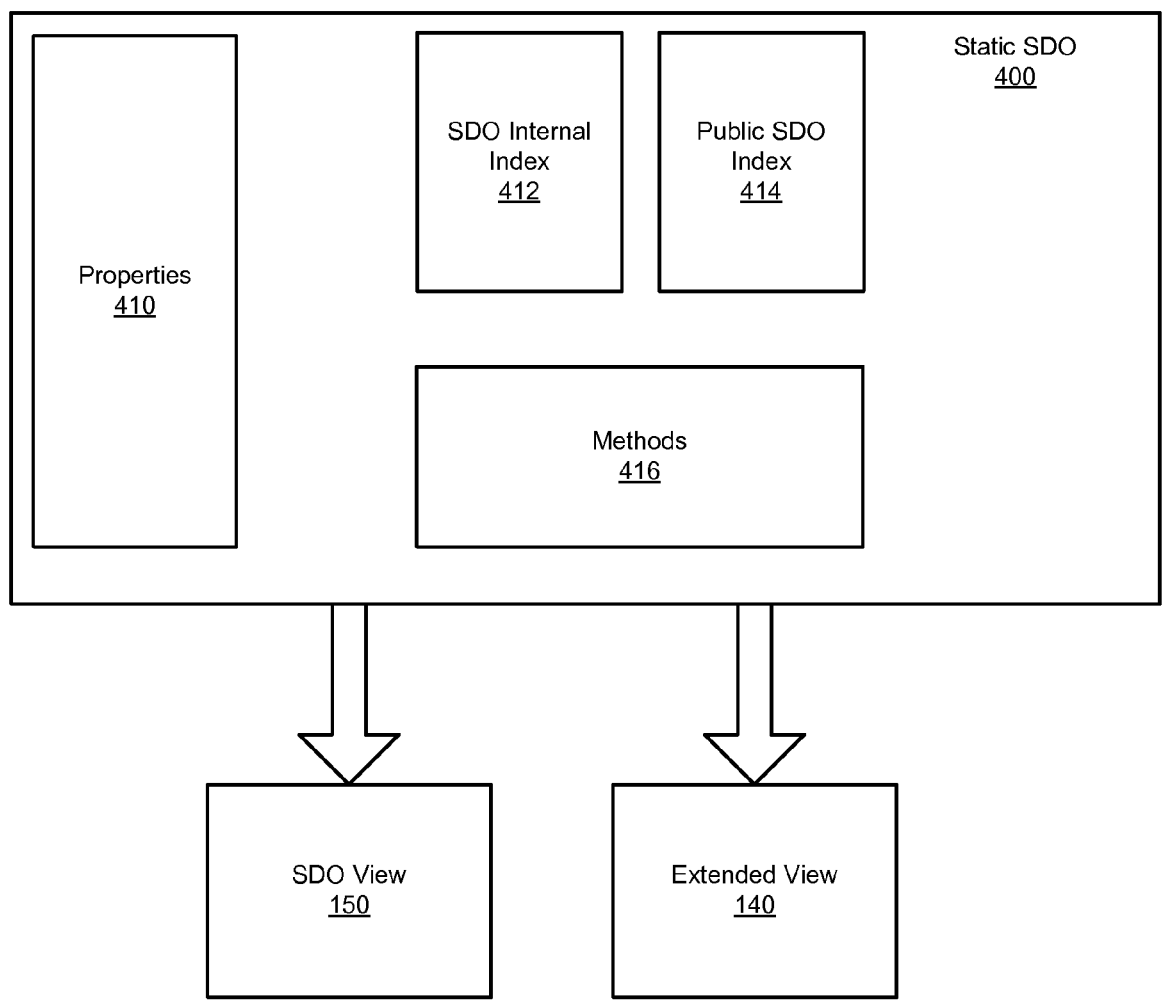
FIG. 4 is a schematic block diagram illustrating one embodiment of a static data object in accordance with the present invention.

FIG. 4 is a schematic block diagram of a static SDO object 400. The Static SDO object 400 comprises a properties module 410, an SDO index 412, a new SDO index 414, and a methods module 416. The properties module 410 comprises the properties associated with the static SDO 400, including both the user-defined properties and the internal properties of the static SDO 400.

The static SDO object 400 further comprises an SDO index 412. Those of skill in the art will recognize that SDO currently provides an SDO index 412, wherein each property found in properties module 410 is assigned a positive index value. A client may pass an index value as a property-identifying parameter to a method, as explained above. For example, a client may specify: workSpace.set(1, "Downie Building"); to set the value of a property associated with an index value of 1 (such as, in this example, the property 'building') to the specified value passed as a parameter. Both internal and user-defined properties are assigned a positive SDO index 412 value.

In accordance with the present invention, the static SDO object 400 further comprises a new SDO index 414. The new SDO index 414 assigns properties a modified index value such that internal properties can be distinguished from user-defined properties. In a preferred embodiment, user-defined properties are assigned a positive index value and internal properties are assigned a negative index value. For example, a user-defined property "building" may have an SDO index 412 value 1, and a new SDO index 414 value of 2. The internal property "tenantGroup" may have an SDO index 412 value 3, and a new SDO index 414 value of −1.

As described above, metadata concerning the properties 410 of the static SDO 400 revealed by the SDO View 150 only reveal user-defined properties in the properties 410. Similarly, requests for metadata concerning the index values of the properties 410 reveal only the positive values of the new SDO index 414 associated with the user-defined properties of the static SDO 400. The negative values of the new SDO index 414 associated with the internal properties of the static SDO 400 are available through the extended view 140.

Methods 416 constitute the methods associated with a particular static SDO 400. In a typical embodiment, the methods 416 will comprise getters and setters for the static properties 410. SDO currently supports operations on properties based on the property's index value, as described above. Thus, a client 160 may pass an SDO index value 412 for a property to a method in methods 416. Those of skill in the art will recognize that currently, methods module 416 in SDO associates an SDO index value 412 with a property 410 using a switch statement such as a case statement.

As described above, in one embodiment of the present invention, only the values of the new SDO Index 414 are made available to a client 160 and the SDO index 412 always remains hidden from the user. When the methods module 416 receives a request for execution of a method with an index value as a parameter, the method module 416 associates the provided new SDO index 414 value with an appropriate method call, and then executes the method call.

In one embodiment, where a client 160 provides a negative new SDO Index 414 value associated with an internal property to the methods module 416, the method module 416 associates the negative new SDO index 414 value with a property 410 through a switch statement and performs the requested operation. In an alternate embodiment, a client 160 may provide a negative new SDO index 414 value to an extended view 140 which invokes a conversion method in methods module 416 to associate a new SDO index 414 value with the associated SDO index 412 value. The extended view 140 then passes the associated SDO index 412 value as part of a call which performs the requested operation.

Figure 5:
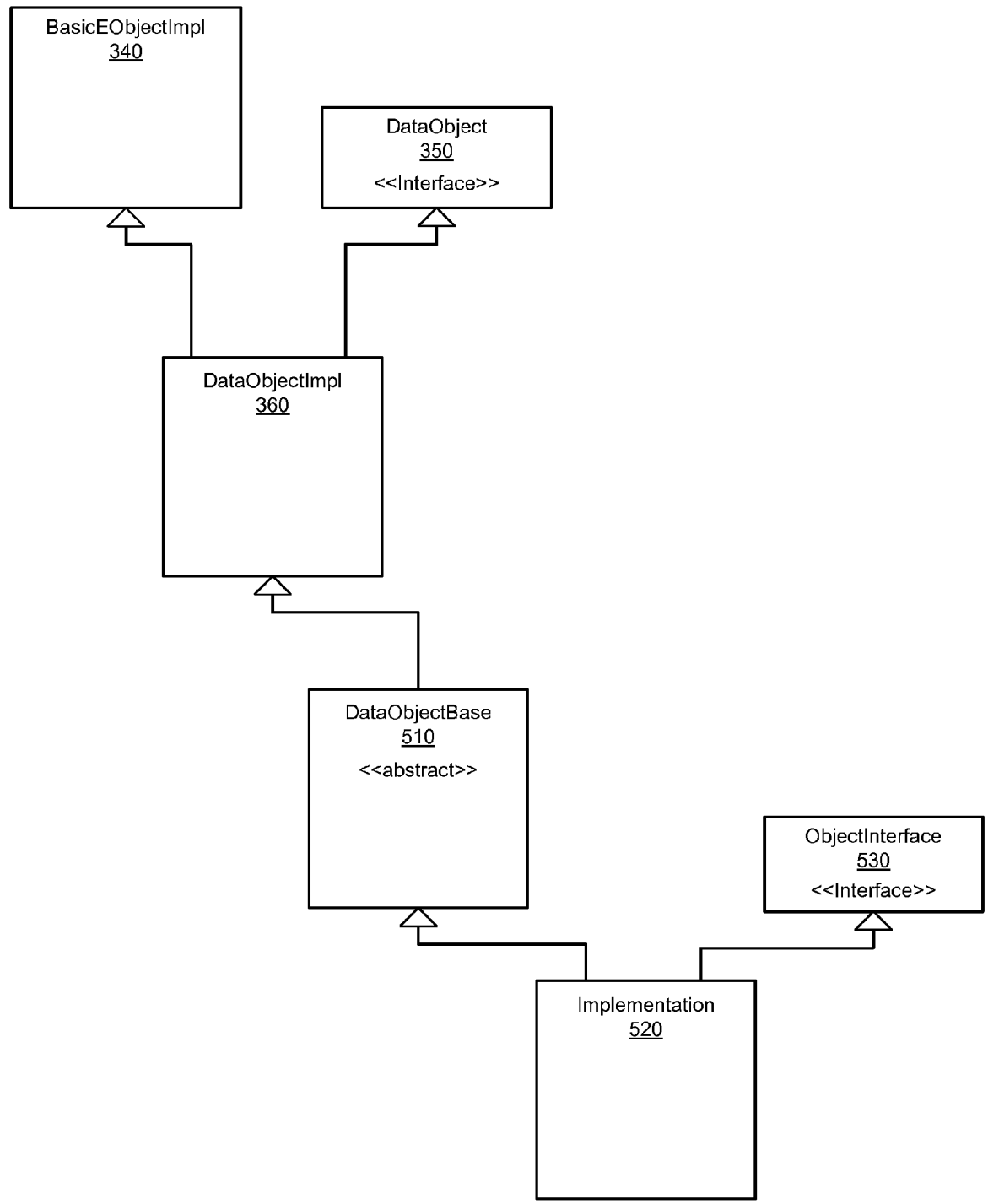
FIG. 5 is a schematic class diagram illustrating one embodiment of an implementation of a static data object such that internal properties are hidden in accordance with the present invention.

FIG. 5 is a schematic class diagram showing an embodiment for the implementation of the functionality described above in connection with FIG. 4. The upper-portion of FIG. 5 corresponds to FIG. 3B, and BasicEObjectImpl 340, DataObject interface 350, and DataObjectImpl 360 have the same definition and purpose as explained above in connection with FIG. 3B.

DataObjectBase 510 is an abstract class extending DataObjectImpl 360 discussed above. DataObjectBase 510 constitutes the base class for generated objects and overrides the implementation of EMF APIs to call generated implementations of the SDO APIs. The DataObjectBase 510 class may contain methods such as:

```
abstract class DataObjectBase extends DataObjectImpl {
    protected abstract int internalConvertIndex
    (int propertyInternalIndex);
    public Object eGet (int propertyInternalConvertIndex, boolean
    resolve, boolean core ) {
    Object result = get(internalConvertIndex( propertyInternalIndex),
    resolve);
    ...
    }
    public void eSet (int propertyInternalIndex, Object value) {
    set(internalConvertIndex(propertyInternalIndex), value);
    }
    ...
}
```

As discussed above, as part of the creation of an SDO, an interface is generated for the particular class. ObjectInterface 530 represents an interface related to a particular class to be implemented in SDO. For example, the Realestate object described above was said to have a complete interface as follows:

```
public interface Realestate {
    String getBuilding( );
    void setBuilding (String value);
    String getIndividualOwner( );
    void setIndividualOwner (String value);
    String getCorporateOwner( );
    void setCorporateOwner (String value);
    String getTenant( );
```

```
        void setTenant(Tenant value);
        FeatureMap getGroup( );
        FeatureMap getTenantGroup( );
}
```

The simple interface generated in accordance with the present invention, corresponding to ObjectInterface 530 in this example, would be:

```
public interface Realestate {
    String getBuilding( );
    void setBuilding (String value);
    String getIndividualOwner( );
    void setIndividualOwner (String value);
    String getCorporateOwner( );
    void setCorporateOwner (String value);
    String getTenant( );
    void setTenant(Tenant value);
}
```

The interface is the same as the interface above, but without the methods related to internal properties.

Those of skill in the art will recognize that, as an abstract class, a client 160 cannot instantiate DataObjectBase 150 objects. As such, Implementation 520 class represents an implementation of a class for a particular static SDO which can be instantiated and generate objects for use by a client 160. Implementation 520 will directly host the static property values associated with the particular object. Implementation 520 extends the abstract DataObjectBase 510 class discussed above, implementing its abstract methods, and also implements ObjectInterface 530. In our Realestate example, Implementation 520 is the RealestateImpl class, which may appear as follows:

```
class RealestateImpl extends DataObjectBase implements Realestate {
protected String building = UNSET;
protected String individualOwner = UNSET;
...
protected Sequence group = null;
protected Sequence tenantGroup = null;
static final int INTERNAL_BUILDING = 0,
INTERNAL_INDIVIDUALOWNER = 1, . . . . INTERNAL_GROUP =
5, INTERNAL_TENANTGROUP =6, BUILDING = 0,
INDIVIDUALOWNER = 1, . . . GROUP = –1,
TENANTGROUP = –2;
protected int internalConvertIndex (int propertyInternalIndex) {
switch (propertyInternalIndex)
    {
        case INTERNAL_BUILDING:
            return BUILDING;
        case INTERNAL_INDIVIDUALOWNER:
            return INDIVIDUALOWNER;
        ...
    }
public Object get (int propertyPublicIndex, boolean resolve) {
switch (propertyPublicIndex)
    {
        case BUILDING:
            return getBuilding( );
        case TENANTGROUP:
            return getTenantGroup( );
        ...
    }
public void set (int propertyPublicIndex, Object value) {
// same pattern as get
}
```

```
    public String getBuilding( ) {
        return building;
    }
...
}
```

As shown in the above example, Implementation 520 directly hosts the property values, such as building, individualOwner, and group in the above example. In addition, as is known to those in the art, SDO assigns the properties, both user-defined and internal, an index value comprising positive integer values. In accordance with the present invention, a modified index is created, where modified index values are assigned to the properties, user-defined properties having positive values and internal properties having negative values.

Implementation 520 further provides an internalConvertIndex method which correlates the internal SDO model index values to the modified index value. In the embodiment shown, this is done by means of a switch statement. Switch statements are similarly used in the get and set methods, such that a client 160 can invoke the method, provide a modified index value as a parameter, and get the expected operation.

As a result, a single switch statement can handle both user-defined properties and internal properties without imposing a significant performance impact on the SDO client. In the case of an advanced client 160 calling EMF methods to access internal features, those of skill in the art will recognize that abstract class DataObjectBase 510 overrides the EMF methods, invokes the internalConvertIndex method provided which relates the provided modified index value to the SDO model index value such that the correct information is returned in response to the client 160's EMF method call. This imposes only a minor performance impact, requiring a call to the internalConvertIndex method before calling the generated accessor instead of calling the accessor directly.

The result is a mechanism for completely hiding the internal features of an EMF object derived from an XML Schema document, where the internal features necessary to fully represent the XML Schema are available to clients 160 with a need for such information, but hidden from clients 160 in most situations in order to simplify interaction with the object. This is implemented such that the solution imposes a minimal impact in terms of increased operational burden on the client 160.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
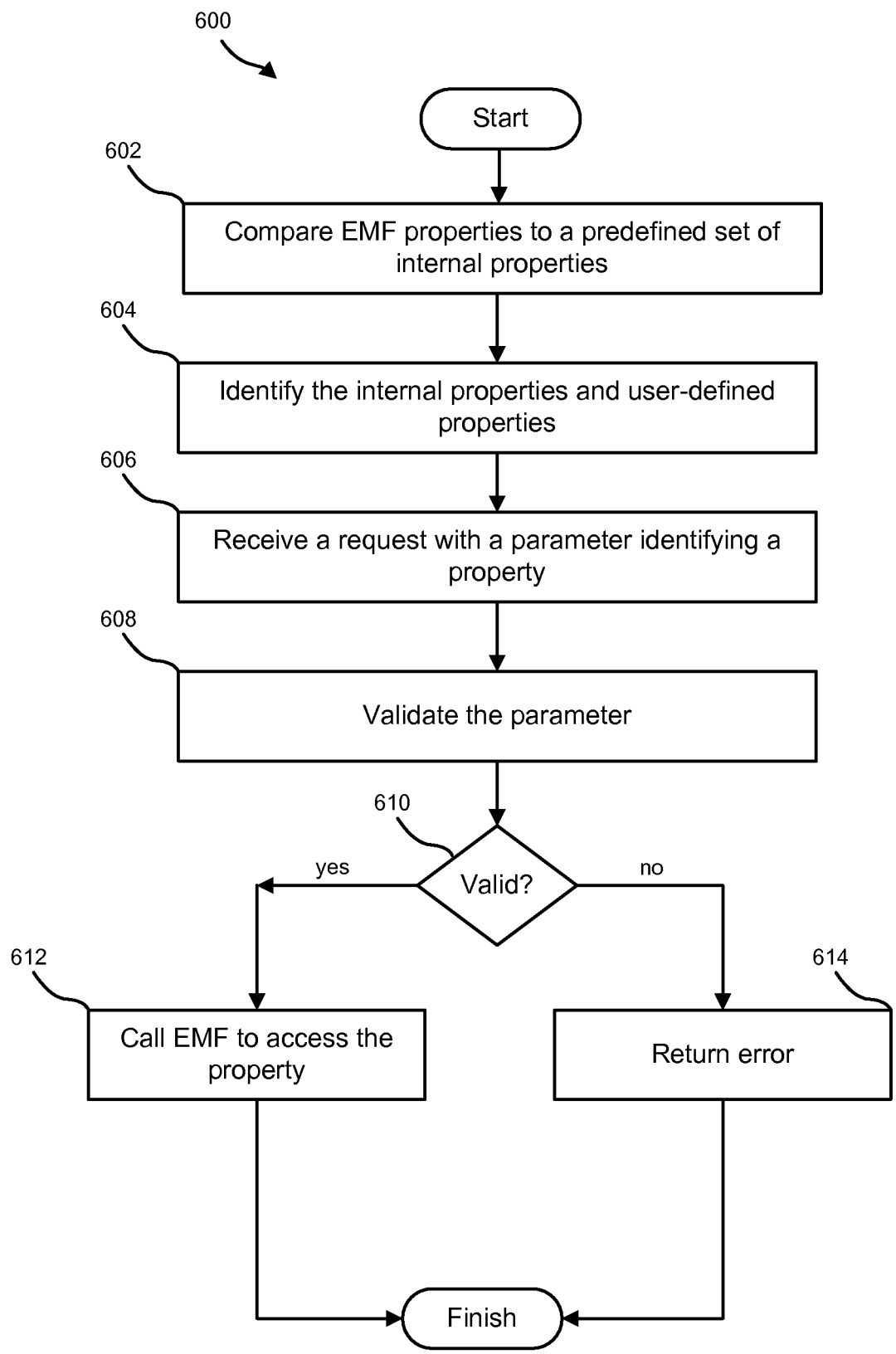
FIG. 6 is a schematic flow chart diagram illustrating one embodiment of hiding internal features of an XML representation object in accordance with the present invention.

FIG. 6 is a schematic flow chart illustrating one embodiment of hiding internal features of an XML representation object in accordance with the present invention. The method 600 starts when the SDO property module 220 compares 602 EMF data object properties 212 to a predefined set of internal properties 222. The SDO property module 220 then identifies 604 the internal properties and user-defined properties of the EMF data object.

The method 600 further comprises the SDO data object implementation 230 receiving 606 a request with a parameter identifying a property. The SDO data object implementation 230 validates 608 the parameter. As shown in FIG. 2, SDO data object implementation 230 may validate the parameter by determining whether the property referenced by the parameter is found in a filtered properties 224 set. In an alternative embodiment, SDO data object implementation 230 may invoke the methods of SDO property module 220 which may dynamically validate the parameter as opposed to comparing the parameter against a static list of valid properties.

The SDO property module 220 determines 610 whether the property referenced by the parameter is a valid property for the given SDO. If so, the SDO property module 220 calls 612 the methods of EMF to access the property and fulfill the request. If the parameter is invalid, SDO property module 220 returns 614 an error indicating to a client 160 that the property referenced is not a valid property of the SDO. The method 600 ends.

Figure 7:
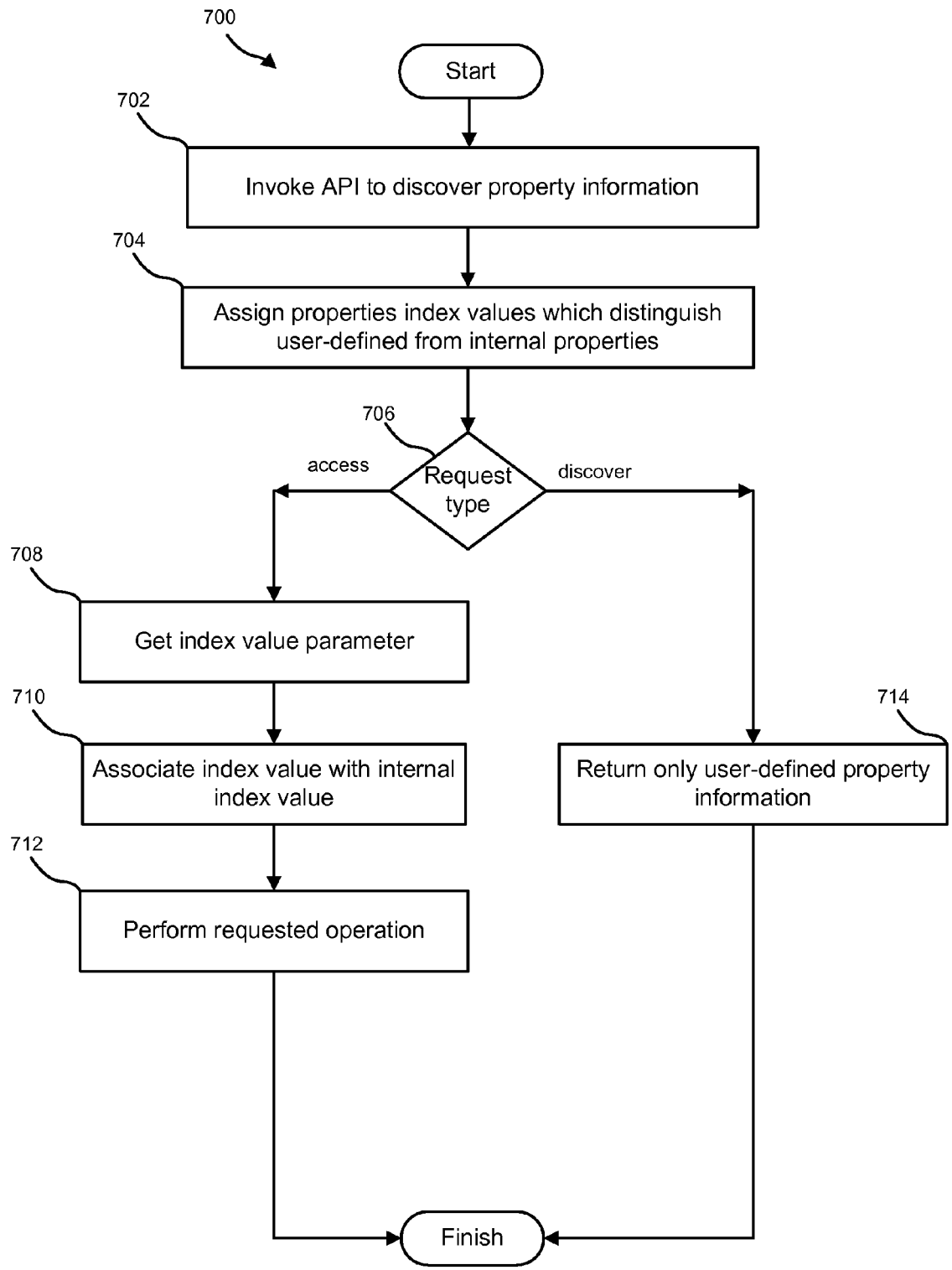
FIG. 7 is a schematic flow chart diagram illustrating one embodiment of the execution of a method for hiding internal features of an XML representation object in accordance with the present invention.

FIG. 7 is a schematic flow chart diagram illustrating one embodiment of the execution of a method for hiding internal features of a static XML representation object in accordance with the present invention. The method 700 starts with a new SDO index module 414 invoking 702 an API to discover property information. The new SDO index module 414 further assigns 704 the properties of the SDO modified index values which distinguish user-defined properties from internal properties. In one embodiment, this is done by assigning positive values to the user-defined properties and negative values to the internal properties.

The method 700 further comprises a static SDO 400 receiving from a client 160 a request concerning the properties of the static SDO 400. The static SDO 400 determines 706 whether the request is an access request, such as a get or set, or a discovery request to which the static SDO 400 should return metadata concerning its properties.

If the request is an access request for which an index value is provided to identify the relevant property, the methods module 416 associates 710 the index value with the SDO internal index value and performs 712 the requested operation. If the request is a discovery request, the static SDO 400 returns 714 to the client 160 metadata related only to the user-defined property information of the static SDO 400. The method 700 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a memory storing a computer readable program for hiding advanced Extensible Markup Language (XML) schema features in Eclipse Modeling Framework (EMF) models, the computer readable program performing operations comprising:

obtaining properties of an EMF model that is based on an XML schema, the EMF model having a plurality of properties derived from the XML schema;

determining which of the properties are internal properties of the EMF model and which of the properties are the user-defined properties of the EMF model, wherein the internal properties represent structural and relational information of the XML schema and user-defined properties represent core data associated with the XML schema;

automatically creating a service data object (SDO) model from the EMF model, the SDO model comprising the internal properties and the user-defined properties, wherein each internal property and user-defined property has an index value;

assigning first modified index values to the internal properties and second modified index values to the user-defined properties;

exposing to a client, through the SDO model, the user-defined properties of the SDO model; and hiding from the client, through the SDO model, the internal properties of the SDO model.

2. The computer program product of claim 1, wherein determining the internal properties of the EMF model and the user-defined properties of the EMF model further comprises:

comparing the properties of the EMF model to a predefined set of internal properties; and identifying the internal properties of the EMF model as those that match the predefined set of internal properties and the user-defined properties of the EMF model as those that do not match the predefined set of internal properties.

3. The computer program product of claim 1, wherein automatically creating the SDO model further comprises receiving the user-defined properties of the SDO model from one or more EMF model artifacts in response to the client invoking a service configured to return property information.

4. The computer program product of claim 1, further comprising issuing a call to a SDO model Application Programming Interface (API) such that a SDO model artifact:

receives a request comprising a parameter identifying a property of the EMF model;

invokes a service configured to validate the parameter; and accesses a property of the EMF model in response to an acknowledgement from the service that the parameter references a valid user-defined property.

5. The computer program product of claim 1, wherein the SDO model exposes the internal properties of the SDO model to the client by way of an extended Application Programming Interface (API), the extended API invoking EMF model methods.

6. The computer program product of claim 1, wherein the SDO model directly hosts one or more static property values.

7. The computer program product of claim 6, further comprising:

receiving from the client a request comprising the modified index value of a property as a parameter; and mapping the modified index value to an actual index value of the property.

8. The computer program product of claim 7, mapping the modified index value further comprising:

associating the modified index value received from the client with an internal SDO model index; and operating on a property value associated with the internal SDO model index.

9. The computer program product of claim 6, wherein a positive second modified index value is assigned to each user-defined property and a negative first modified index value is assigned to each internal property.

10. The computer program product of claim 1, wherein creating the SDO model from the EMF model further comprises returning SDO model metadata in response to a client request, wherein the metadata comprises the user-defined properties in response to the client request by way of a SDO model Application Programming Interface (API), and comprises the internal properties in response to the client request by way of a SDO model extended API.

11. The computer program product of claim 3, wherein the client invoking a service configured to return property information of the EMF model further comprises a get method.

12. The computer program product of claim 3, wherein the client invoking a service configured to return property information of the EMF model further comprises a set method.

13. The computer program product of claim 1, wherein the SDO model is configured to expose the user-defined properties by way of a SDO model interface and to expose the internal properties exclusively by way of an extended interface.

14. The computer program product of claim 1, wherein one or more EMF artifacts comprise classes, and wherein manipulating the one or more EMF artifacts comprises extending EMF classes.

15. A computer program product comprising a memory storing a computer readable program for hiding advanced Extensible Markup Language (XML) schema features in Service Data Objects (SDOs), the computer readable program performing operations comprising:
    obtaining properties of an Eclipse Modeling Framework (EMF) model that is based on an XML schema;
    determining which of the properties are internal properties of the EMF model and which of the properties are user-defined properties of the EMF model, wherein the internal properties represent structural and relational information of the XML schema and user-defined properties represent core data associated with the XML schema;
    automatically creating an SDO model from the EMF model, the SDO model comprising the internal properties and the user-defined properties, wherein each internal property and user-defined property has an index value and the SDO model exposes the internal properties of the SDO model to the client by way of an extended API, the extended API invoking EMF model methods;
    assigning first modified index values to the internal properties and second modified index values to the user-defined properties;
    exposing to a client, through the SDO model, the user-defined properties of the SDO model; and
    hiding from the client, through the SDO model, the internal properties of the SDO model.

16. The computer program product of claim 15, wherein determining which of the properties are internal properties of the EMF model and which of the properties are the user-defined properties of the EMF model further comprises:
    comparing the properties of the EMF model to predefined set of internal properties; and
    identifying the internal properties of the EMF model as those that match the predefined set of internal properties and the user-defined properties of the EMF model as those that do not match the predefined set of internal properties.

17. The computer program product of claim 15, wherein exposing the user-defined properties of the SDO model further comprises a SDO artifact returning the user-defined properties of the SDO model in response to the client invoking a service configured to return property information of the SDO model.

18. The computer program product of claim 15, further comprising issuing a call to a SDO Application Programming Interface (API) such that a SDO artifact:
    receives a request comprising a parameter identifying a property;
    invokes a service configured to validate the parameter; and
    accesses a property of the EMF model in response to an acknowledgement from the service that the parameter references a valid user-defined property.

19. The computer program product of claim 15, wherein the SDO model directly hosts one or more static property values.

20. The computer program product of claim 19, further comprising:
    receiving from the client a request comprising the modified index value of a property as a parameter; and
    mapping the modified index value to an actual index value of the property.

21. The computer program product of claim 20, mapping the modified index value further comprising:
    associating the modified index value received from the client with an internal SDO model index; and
    operating on a property value associated with the internal SDO model index.

22. The computer program product of claim 15, wherein a positive second modified index value is assigned to each user-defined property and a negative first modified index value is assigned to each internal property.

23. The computer program product of claim 15, wherein creating the SDO model from the EMF model further comprises returning SDO model metadata in response to a client request, wherein the metadata comprises the user-defined properties in response to the client request by way of a SDO Application Programming Interface (API), and comprises the internal properties in response to a client request by way of a SDO extended API.

24. The computer program product of claim 15, wherein the SDO model is configured to expose the user-defined properties by way of a SDO model interface and to expose the internal properties exclusively by way of an extended interface.

25. The computer program product of claim 15, wherein EMF artifacts are classes and interfaces, and wherein manipulating the EMF artifacts comprises extending EMF classes and implementing interfaces.

26. A system for hiding advanced Extensible Markup Language (XML) schema features in EMF models, the system comprising:
    one or more processors in communication with memory comprising:
    an XML schema document;
    an Eclipse Modeling Framework (EMF) implementation; and
    a Service Data Object (SDO) implementation, the SDO implementation further comprising:
        an SDO property module configured to compare properties of the EMF model to a predefined set of internal properties, and to identify internal properties of the EMF model as those that match the predefined set of internal properties and the user-defined properties of the EMF model as those that do not match the set of predefined internal properties, wherein each internal property and user-defined property has an index value, the internal properties represent structural and relational information of the XML schema and user-defined properties represent core data associated with the XML schema, the SDO property module further assigning first modified index values to the internal properties and second modified index values to the user-defined properties;

an SDO data object implementation module comprising an Application Programming Interface (API) configured to expose to a client the user-defined properties of an SDO model and to hide from the client the internal properties of the SDO model; and an SDO internal properties access module comprising an extended API configured to expose internal properties of the SDO model in response to the client invoking the extended API.

27. The system of claim 26, wherein the SDO data object implementation module further comprises an SDO metadata module configured to reveal SDO metadata for user-defined properties, and wherein the SDO internal properties access module further comprises an SDO extended metadata module configured to reveal SDO metadata for internal properties.

28. The system of claim 26, wherein the EMF implementation further comprises a EClassImpl class and a BasicEObjectImpl class.

29. The system of claim 28, wherein the SDO implementation comprises a ClassImpl class extending the EClassImpl class and a DataObjectImpl class extending the BaseEObjectImpl class.

30. A method for hiding advanced Extensible Markup Language (XML) schema features in Eclipse Modeling Framework (EMF) models, the method comprising:

obtaining, using a processor, properties of an EMF model that is based on an XML schema, the EMF model having a plurality of properties derived from the XML schema;

determining which of the properties are internal properties of the EMF model and which of the properties are the user-defined properties of the EMF model, wherein the internal properties represent structural and relational information of the XML schema and user-defined properties represent core data associated with the XML schema;

automatically creating a service data object (SDO) model from the EMF model, the SDO model comprising the internal properties and the user-defined properties, wherein each internal property and user-defined property has an index value;

assigning first modified index values to the internal properties and second modified index values to the user-defined properties;

exposing to a client, through the SDO model, the user-defined properties of the SDO model; and hiding from the client, through the SDO model, the internal properties of the SDO model.

31. The method of claim 30, wherein determining the internal properties of the EMF model and the user-defined properties of the EMF model further comprises:

comparing the properties of the EMF model to a predefined set of internal properties; and identifying the internal properties of the EMF model as those that match the predefined set of internal properties and the user-defined properties of the EMF model as those that do not match the predefined set of internal properties.

32. The method of claim 30, wherein automatically creating the SDO model further comprises receiving the user-defined properties of the SDO model from one or more EMF model artifacts in response to the client invoking a service configured to return property information.

33. The method of claim 30, further comprising issuing a call to a SDO model Application Programming Interface (API) such that a SDO model artifact:

receives a request comprising a parameter identifying a property of the EMF model;

invokes a service configured to validate the parameter; and accesses a property of the EMF model in response to an acknowledgement from the service that the parameter references a valid user-defined property.

34. The method of claim 30, wherein the SDO model exposes the internal properties of the SDO model to the client by way of an extended Application Programming Interface (API), the extended API invoking EMF model methods.

35. The method of claim 30, wherein the SDO model directly hosts one or more static property values.

36. The method of claim 35, further comprising:

receiving from the client a request comprising the modified index value of a property as a parameter; and mapping the modified index value to an actual index value of the property.

37. The method of claim 30, wherein creating the SDO model from the EMF model further comprises returning SDO model metadata in response to a client request, wherein the metadata comprises user-defined properties in response to the client request by way of a SDO model Application Programming Interface (API), and wherein the metadata comprises internal properties in response to the client request by way of a SDO model extended API.

38. The method of claim 30, wherein the SDO model is configured to expose the user-defined properties by way of a standard SDO model interface, and wherein hiding the internal properties comprises exposing the internal properties exclusively by way of an extended interface.

* * * * *